United States Patent
Cilio et al.

(10) Patent No.: US 9,419,448 B1
(45) Date of Patent: Aug. 16, 2016

(54) MULTI-MODULE, SCALABLE, HIGH POWER DENSITY, RADIATION-HARDENED POWER CONVERTER INTERFACE SYSTEM

(71) Applicant: Arkansas Power Electronics International, Inc., Fayetteville, AR (US)

(72) Inventors: Edgar Cilio, Farmington, AR (US); Washington Cilio, Siloam Springs, AR (US)

(73) Assignee: Cree Fayetteville, Inc., Fayetteville, AR (US)

( * ) Notice: Subject to any disclaimer, the term of this patent is extended or adjusted under 35 U.S.C. 154(b) by 55 days.

(21) Appl. No.: 14/308,308

(22) Filed: Jun. 18, 2014

Related U.S. Application Data

(60) Provisional application No. 61/836,482, filed on Jun. 18, 2013.

(51) Int. Cl.
*H02J 7/00* (2006.01)

(52) U.S. Cl.
CPC ............ *H02J 7/0014* (2013.01); *H02J 7/0054* (2013.01)

(58) Field of Classification Search
CPC .............................. H02J 7/0014; H02J 7/0054
USPC ......... 320/116, 119, 121, 122, 125, 138, 160, 320/124
See application file for complete search history.

(56) References Cited

U.S. PATENT DOCUMENTS

| | | | | |
|---|---|---|---|---|
| 4,301,398 A * | 11/1981 | Johnson | ................. | H02M 3/315 320/143 |
| 4,503,863 A * | 3/1985 | Katims | ................. | A61B 5/0484 128/905 |
| 5,345,162 A * | 9/1994 | Shiojima | ............... | H02J 7/0081 320/164 |
| 5,969,502 A | 10/1999 | Beard | ........................... | 320/116 |
| 6,121,751 A | 9/2000 | Merritt | ......................... | 320/116 |
| 7,508,171 B2 | 3/2009 | Carrier et al. | ................. | 320/138 |
| 7,602,146 B2 | 10/2009 | Carrier et al. | ................. | 320/120 |
| 7,880,435 B2 | 2/2011 | Ibrahim | ........................ | 320/122 |
| 8,044,640 B2 | 10/2011 | Cruise et al. | .................. | 320/162 |
| 8,098,048 B2 | 1/2012 | Hoff | .............................. | 320/120 |
| 8,358,108 B2 | 1/2013 | Seman, Jr. et al. | ............ | 320/134 |
| 8,421,400 B1 | 4/2013 | Khanna | ......................... | 320/101 |
| 8,669,738 B1 * | 3/2014 | Powell | .................. | H02J 7/0093 320/107 |
| 9,252,626 B2 * | 2/2016 | Coe | ....................... | H01M 10/44 |
| 2003/0117109 A1 * | 6/2003 | Trepka | .................. | H01M 10/46 320/126 |
| 2005/0088144 A1 * | 4/2005 | Pacholok | ................ | H02J 7/022 320/131 |
| 2007/0019442 A1 * | 1/2007 | Li | ............................. | H02J 1/08 363/15 |
| 2007/0170890 A1 * | 7/2007 | Fee | ........................ | H02J 7/0093 320/128 |
| 2008/0054848 A1 * | 3/2008 | Yun | ..................... | G01R 31/3651 320/134 |
| 2009/0309553 A1 * | 12/2009 | Marinka-Toth | ........ | H02J 7/0093 320/155 |
| 2010/0164437 A1 * | 7/2010 | McKinley | ............ | H01M 10/049 320/145 |
| 2011/0163728 A1 * | 7/2011 | Sutardja | ................ | H02J 7/0016 320/163 |
| 2013/0301803 A1 * | 11/2013 | Liu | ........................ | A61B 6/42 378/114 |
| 2014/0210398 A1 * | 7/2014 | Powell | ................... | H02J 7/0055 320/104 |
| 2014/0375270 A1 * | 12/2014 | Coe | ....................... | H01M 10/44 320/112 |
| 2015/0295443 A1 * | 10/2015 | Powell | ...................... | H02J 7/04 320/107 |

\* cited by examiner

*Primary Examiner* — Phallaka Kik
(74) *Attorney, Agent, or Firm* — Baker & Hostetler LLP

(57) ABSTRACT

The novel cell balancing approach being disclosed minimizes the number of controlled active devices to enable Li-ion cell balancing in a battery arrangement. This is accomplished through a network of passive components associated with each cell. The network of passive components forms a bandpass filter. This allows selective charging of a cell purely based on the frequency components of a variable switching frequency controller.

7 Claims, 4 Drawing Sheets

MULTI-MODULE, SCALABLE, HIGH POWER DENSITY, RADIATION-HARDENED POWER CONVERTER INTERFACE SYSTEM

CROSS-REFERENCE TO RELATED APPLICATIONS

This application claims priority to and is a continuation-in-part of U.S. Provisional Patent Application Ser. No. 61/836,482, filed on Jun. 18, 2013 entitled MULTI-MODULE, SCALABLE, HIGH POWER DENSITY, RADIATION-HARDENED POWER CONVERTER INTERFACE SYSTEMS which is hereby incorporated by reference in its entirety.

STATEMENT REGARDING FEDERALLY SPONSORED RESEARCH OR DEVELOPMENT

This invention was made with government support under grant FA9453-12-M-0326 awarded by the United States Air Force. The United States government has certain rights in the invention.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in power converters for battery charging systems. More particularly, the invention relates to improvements particularly suited for lightweight high-temperature high-stress environments for electronics with high reliability requirements.

2. Description of the Known Art

As will be appreciated by those skilled in the art, batteries and chargers for those batteries are known in various forms. Lithium-ion batteries require cell balancing to achieve proper charging and discharging over the life of the battery pack. In a typical application, lithium-ion battery cells are connected in series to achieve the desired nominal voltage from the resulting battery. One would think that a simple charger of the appropriate voltage could charge the series string of batteries. However, variations in individual cells' maximum capacity prevent all the cells in a series string from being properly charged without damaging the weaker cells. In order to avoid damaging overcharging events, a cell balancing and bypass circuit is needed. Cell balancing circuits ensure that all Li-ion cells are optimally charged to their maximum level by monitoring each cell's state of charge and individually charging them to their optimal level while keeping already fully charged cells from overcharging. Currently, there are several hardware implementations to achieve cell balancing such as current bypass circuits and charge redistribution circuits. Current bypass or charge shunt circuits suffer from high inefficiency associated with the dissipative elements used to accomplish the current bypass.

Patents disclosing information relevant to batteries and chargers include: U.S. Pat. No. 8,421,400, issued to Khanna on Apr. 16, 2013, entitled Solar-powered battery charger and related system and method; U.S. Pat. No. 8,358,108, issued to Seman, Jr., et al. one Jan. 22, 2013 entitled System and method for re-initiating charge cycle for battery pack left in a charger; U.S. Pat. No. 8,098,048, issued to Hoff on Jan. 17, 2012 entitled Battery charger with integrated cell balancing; U.S. Pat. No. 8,044,640, issued to Cruise, et al. on Oct. 25, 2011 entitled Method for stepping current output by a battery charger; U.S. Pat. No. 7,880,435, issued to Ibrahim on Feb. 1, 2011 entitled Multi-battery charger with individual battery bypass control; U.S. Pat. No. 7,602,146, issued to Carrier, et al. on Oct. 13, 2009 entitled Protection methods, protection circuits and protection devices for secondary batteries, a power tool, charger and battery pack adapted to provide protection against fault conditions in the battery pack; U.S. Pat. No. 7,508,171, issued to Carrier, et al. on Mar. 24, 2009 entitled Protection methods, protection circuits and protective devices for secondary batteries, a power tool, charger and battery pack adapted to provide protection against fault conditions in the battery pack; U.S. Pat. No. 6,121,751, issued to Merritt on Sep. 19, 2000 entitled Battery charger for charging a stack of multiple lithium ion battery cells; and U.S. Pat. No. 5,969,502, issued to Beard on Oct. 19, 1999 entitled Battery charger capable of independently charging electromagnetic cells. Each of these patents is hereby expressly incorporated by reference in their entirety.

From these prior references it may be seen that these prior art patents are very limited in their teaching and utilization, and an improved power converter and charging system is needed to overcome these limitations.

SUMMARY OF THE INVENTION

The present invention is directed to an improved cell balancing methodology and device using a unique bandpass filter attached to each battery in the series stack. In this manner, each cell has a specific frequency for charging. A frequency shifting block attached to the entire series stack of all of the cells. The frequency shifting block generates one or more charging signals with each signal having a frequency such that that signal is specifically directed to an individual cell in the series stack. In this cell balancing methodology, each cell has two associated impedances. This block is able to produce specific charging energy signals to match individual cell's associated filtering impedances. This method assigns a particular frequency signature to each cell in order to bypass fully charged cells and charge the ones that are not fully charged.

Advantages of the present invention include minimizing the number of controlled active devices to enable cell balancing. This is accomplished through a network of passive components associated with each cell. The network of passive components forms a bandpass filter. This allows selective charging of a cell purely based on the frequency components of a variable switching frequency controller.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction there

DETAILED DESCRIPTION OF THE INVENTION

Figure 1:
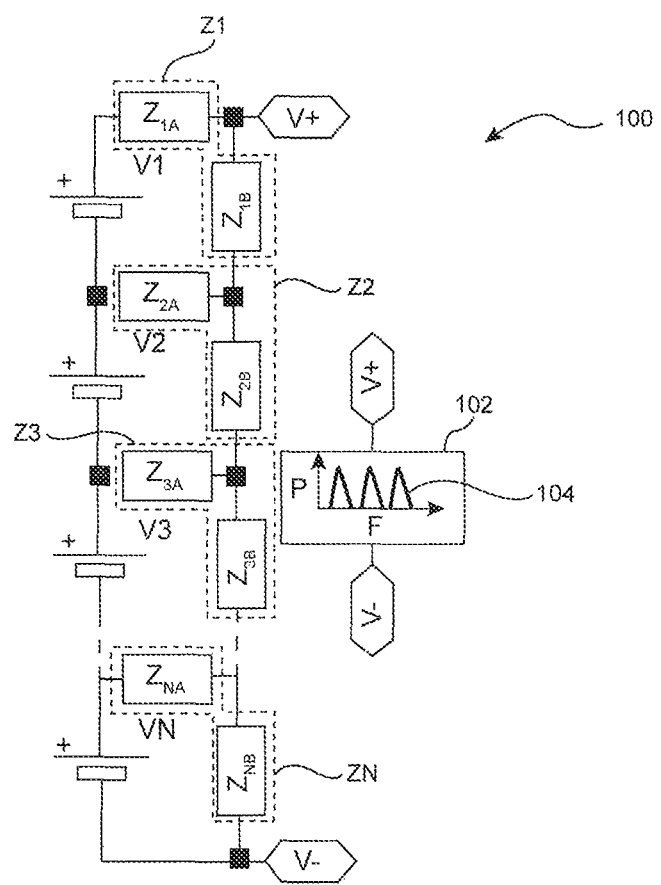
- FIG. 1 is a functional block level representation of the proposed selective cell charging through charge energy frequency spreading.

As shown in FIGS. 1 through 4 of the drawings, one exemplary embodiment of the present invention is generally shown as a selective cell charger 100 for charging individual cells V1, V2, V3, . . . VN. The selective cell charger 100 uses a frequency shifting block 102 to generate a frequency charge signal 104 for charge energy frequency spreading as a novel method seeking to minimize active device part count while yielding fast, dynamic response to individual cells' state of charge. This approach enables the selective charge of individual cells such as V1 based solely on the frequency components contained in the charge power signal 104. In FIG. 1, a functional block level description of the selective cell charger 100 is shown. In this arrangement, each cell V1, V2, V3, . . . VN has an associated impedance network Z1, Z2, Z3, . . . ZN. Each associated impedance network Z1, Z2, Z3, . . . ZN is comprised of passive components including a take off component Z1A, Z2A, Z3A, . . . ZNA and a series stack component Z1B, Z2B, Z3B, . . . ZNB. The frequency shifting block 102 is connected across the battery terminals V+ and V−. This block 102 is able to produce specific charging energy signals 104 to match individual cell's V1, V2, V3, . . . VN associated filtering impedances set by the associated impedance network Z1, Z2, Z3, . . . ZN. This method assigns a particular frequency signature to each cell in order to bypass fully charged cells and charge the ones that are not fully charged. Unlike other cell level charge redistribution approaches, this approach can be implemented with minimal part count. Targeted cell charging can be achieved with software changes in the command signal to produce the desired frequency components found in the energy charging signal.

Figure 2:
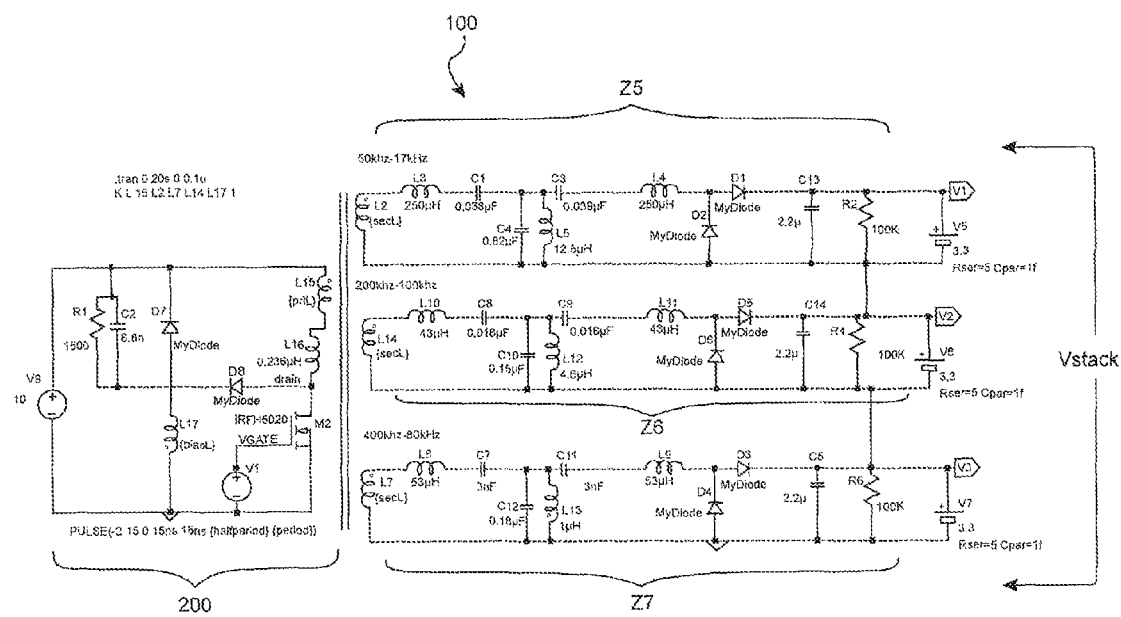
FIG. 2 provides a selective cell charging schematic for three different battery cells.

The circuit depicted in FIG. 2 is one way to implement the in hardware for the selective cell charger 100. In this representation only three cells V5, V6, V7 are shown on the right side for simplicity although almost an infinite plurality of cells can be accommodated with this circuit. The design uses a forward converter transformer topology 200 to transfer power to the cell charging circuits Z5, Z6, Z7 on the isolated side. These bandpass filters Z5, Z6, Z7 selectively accept power transfer to the cell V5, V6, V7 based on the frequency signature of the bandpass filters Z5, Z6, Z7 given to the cell V5, V6, V7, while all other frequencies are rejected and power transfer is limited.

After filtering the input, a DC-restore diode (D2, D4, and D6 in FIG. 2) is necessary after each passband filter to transfer power through the rectifying diode (D1, D3, and D5 in FIG. 2). Finally, FIG. 2 depicts a battery V5, V6, V7 connected to each isolated filter output and connected in series to simulate a typical battery stack Vstack.

Figure 3:
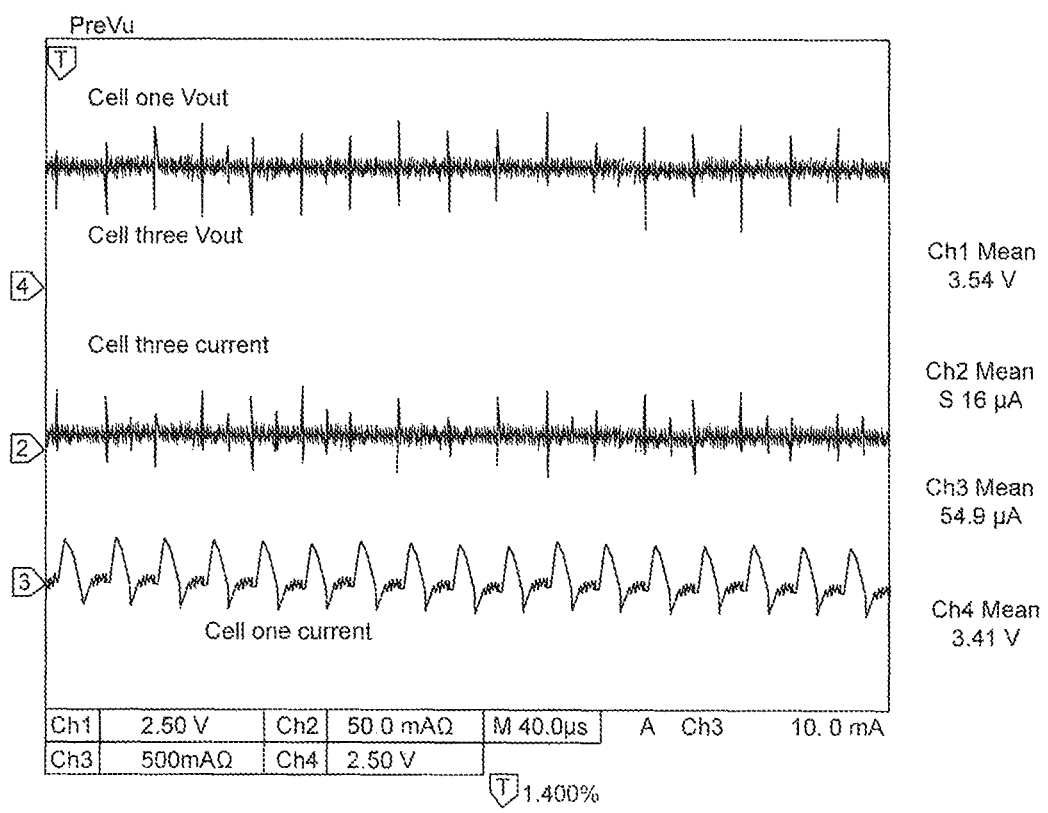
FIG. 3 shows a waveform showing cells one and three in a series charging test at 42 kHz.
Figure 4:
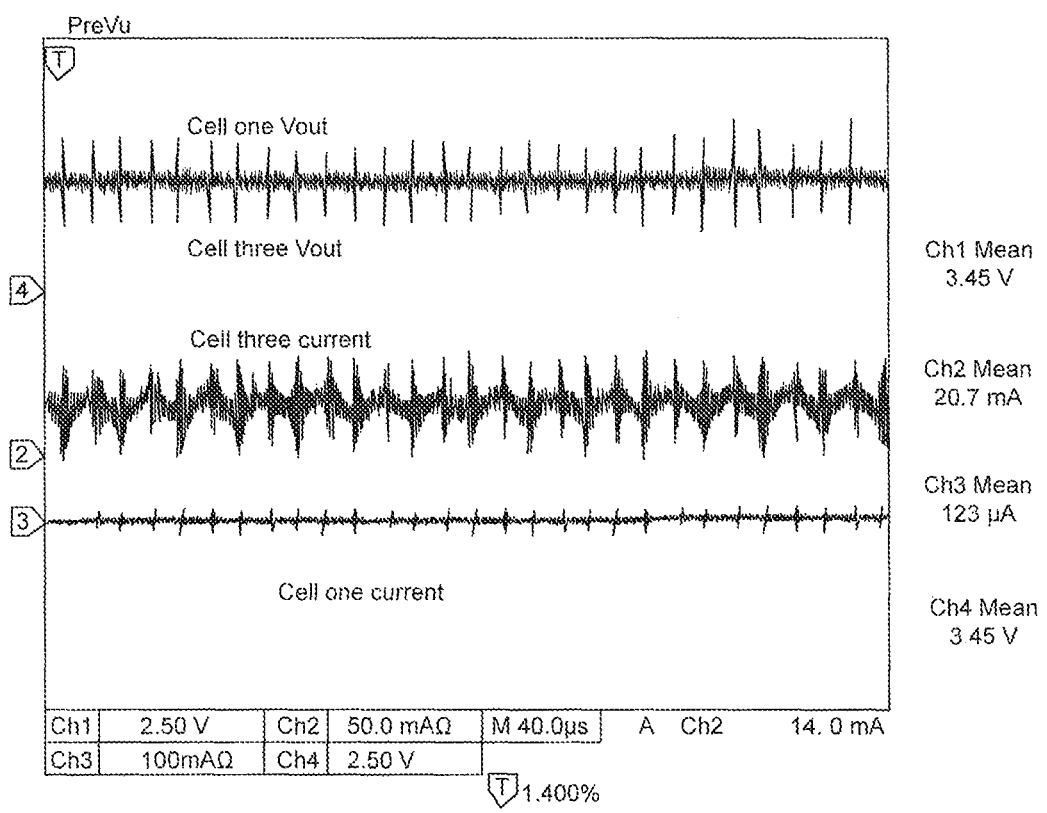
FIG. 4 shows a waveform showing cells one and three in a series charging test at 335 kHz.

Proof of the operation was done with a demonstration and FIGS. 3 and 4 provide the waveform evidence proving this demonstration. Cells one and three were placed in series to represent a basic battery stack. The bandpass center frequency for cell one is 42 kHz while the passband center frequency for cell three is 335 kHz. Next, both cells were connected directly to their respective filters. The system was powered by a 10 V power supply and the switching signal was controlled directly through a function generator. An isolated voltage probe was placed on cell one to measure its voltage, while a non-isolated voltage probe was used for cell three. Additionally, currents for each cell were monitored using Hall Effect current sensors.

FIG. 3 shows the results for the test for a 42 kHz signal with a 20% duty cycle. The current for cell one shows to be properly charging the battery at an average current of 55 mA. Furthermore, cell three shows the average current in the micro-amp range. Both results validate the proper operation of the filters to reject and accept charge depending on the frequency of the signal applied. Subsequently, a 335 kHz signal with 20% duty cycle was delivered to the control input. The results are shown in FIG. 4 where the current through cell one is in the micro-amp range, which is indicative that it is not charging. The result for cell one validates the filter's ability to reject the 335 kHz frequency. As for cell three, an average current of 20 mA is being delivered to the cell. The filter associated with cell three is able to allow transfer of power to the specific cell. Thus, a novel cell balancing circuit has been shown and described and its operation proven. This novel balancing method enables the charging of battery cells with minimal part count of controllable active devices while enabling the ability to dynamically respond to cell-balancing needs.

Reference numerals used throughout the detailed description and the drawings correspond to the following elements:
- selective cell charger 100
- frequency shifting block 102
- frequency charge signal 104
- First cell V1
- Second cell V2
- Third cell V3
- Nth cell VN
- first impedance network Z1
- second impedance network Z2
- third impedance network Z3
- Nth impedance network ZN
- First take off component Z1A
- Second take off component Z2A
- Third take off component Z3A
- Nth take off component ZNA
- First series stack component Z1B
- Second series stack component Z2B
- Third series stack component Z3B
- Nth series stack component ZNB
- Positive battery terminal V+
- Negative Battery Terminal V−
- First DC-restore diode D2
- Second DC-restore diode D6
- Third DC-restore diode D4
- First rectifying diode D1
- Second rectifying diode D5
- Third rectifying diode D3
- First demonstration battery cell V5
- Second demonstration battery cell V6
- Third demonstration battery cell V7
- Three cell battery stack Vstack From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A selective cell charger apparatus for a battery stack comprising a plurality of individual cells stacked in series, the apparatus comprising:
   a plurality of unique frequency impedance networks with each unique frequency impedance network individually attached to one cell of the individual cells, the unique frequency impedance network defining a unique band pass filter frequency that is unique to one cell of the individual cells; and
   a frequency shifting block generating a frequency charge signal including at least one charging frequency matching the band pass filter frequency that is unique to the one cell.

2. The apparatus of claim 1, each unique frequency impedance network including a take off component.

3. The apparatus of claim 1, each unique frequency impedance network including a series stack component.

4. A selective cell charger apparatus for a battery stack comprising a first cell and a second cell stacked in series, the apparatus comprising:
   a first plurality of unique frequency impedance networks electrically connected to the first cell and defining a first band pass filter frequency;
   a second plurality of unique frequency impedance networks electrically connected to the second cell and defining a second band pass filter frequency; and
   a frequency shifting block generating a frequency charge signal selectively including a charge signal selected from the frequency group including a first charging frequency matching the first band pass filter frequency and a second charging frequency matching the second band pass filter frequency.

5. The apparatus of claim 4, wherein the first band pass filter frequency is forty two kilohertz.

6. The apparatus of claim 5, wherein the second band pass filter frequency is three hundred and thirty five kilohertz.

7. The apparatus of claim 4, wherein the second band pass filter frequency is three hundred and thirty five kilohertz.

* * * * *